United States Patent [19]

Passer

[11] 3,718,068
[45] Feb. 27, 1973

[54] HOLE PLUG FASTENERS
[75] Inventor: LaRoy B. Passer, Wyomissing, Pa.
[73] Assignee: USM Corporation, Flemington, N.J.
[22] Filed: April 14, 1971
[21] Appl. No.: 133,802

[52] U.S. Cl. ........................................85/71, 85/72
[51] Int. Cl. ..............................................F16b 13/06
[58] Field of Search............85/71, 70, 72, 73, 74, 77, 85/1 JP, 3 R; 220/24.5, 25; 215/53, 52, 85; 217/108, 110; 222/563; 52/514; 138/97–99

[56] References Cited

UNITED STATES PATENTS

| 559,656 | 5/1896 | Zeilstra | 217/108 |
| 1,249,422 | 12/1917 | Kook | 220/25 X |
| 959,545 | 5/1910 | Joseph | 85/70 |
| 1,797,766 | 3/1931 | Frye | 85/1 JP |
| 2,762,252 | 9/1956 | Karitzky | 85/71 |
| 3,316,796 | 5/1967 | Young | 85/71 X |

FOREIGN PATENTS OR APPLICATIONS

| 225,149 | 11/1959 | Australia | 85/73 |

Primary Examiner—Ramon S. Britts
Attorney—Richard A. Wise and Carl E. Johnson

[57] ABSTRACT

A composite blind fastener particularly well adapted for closing holes in the ½ to 1½ inch diameter range in sheet material is provided. It comprises a sealing disc or cap engageable with one side of a workpiece having a hole to be plugged, a headed mandrel extending through the cap and the hole in the workpiece, and an axially collapsible, radially expansible anchoring or clamping member secured on the mandrel for engagement with the blind side of the disc. Advantageously, the anchoring member may be stamped from a piece of sheet stock and formed with an initial body diameter slightly smaller than the hole to be plugged. Retraction of the mandrel head causes the inserted member to contract axially and be radially enlarged to clamp the disc in hole closing relation against the workpiece. The retracted mandrel is preferably formed to be locked into the installed plug fastener.

3 Claims, 7 Drawing Figures

PATENTED FEB 27 1973 3,718,068

*Inventor*
LaRoy B. Passer
By his Attorney
Carl E. Johnson.

HOLE PLUG FASTENERS

BACKGROUND OF THE INVENTION

This invention relates to an easily applied device for closing or plugging holes.

A need exists for a reliable yet economical means for plugging holes, especially those of ½ inch diameter and larger, provided in sheet material. By way of example, the body panels of vehicles are usually provided with vent or drain holes through which a primer coat, paint or other fluid is allowed to run off, and it is thereafter desirable to close such holes permanently. Such holes, incidentally, are seldom less than ½ inch diameter and preferably are greater than ¾ inch since the drainage rate otherwise may be so slow as to require an automobile assembly production line to be retarded.

In some instances rubber plugs have hitherto been used but are found to deteriorate, come loose, and be lost rather easily. Plastic hole sealing inserts of nylon or the like have been employed but are often found to be loosened by vibration or weakened and deformed in time to the point of uncovering the hole, and when located near an exhaust line, for instance, nonmetal plugs melt and drop out of their holes. Moreover, if as is sometimes the case, dished or cuplike metal inserts are used for panel plugging, it is found that they tend to warp, especially when subjected to large temperature changes, and fail to be retained.

Regardless of the particular application, it is recognized as highly desirable that it be possible to easily secure a permanent plug from only one side of a workpiece since its other side may be inaccesible. In such situations it is advantageous that proper expansiveness of a "blind" plug fastener will be attained during its insertion to insure permanent retention.

While the invention is contemplated as useful in plugging holes found in metal body panels, it will be appreciated that it is also applicable to other sheet material both in the automobile and other fields.

SUMMARY OF THE INVENTION

In view of the foregoing, a main object of this invention is to provide a durable yet inexpensive blind plug affording controlled expansion.

Another object of the invention is to provide a radially expansible hole plug, especially for holes larger than ½ inch diameter, which may be secured in working position by a retractive pull-to-set or non-rotative force and thereafter be difficult to dislodge.

A further and more specific object of this invention is to provide a simple, three-part metal fastener adapted for clamping to sheet material in closing relation to a hole formed therein.

To these ends and in accordance with a feature of the invention, one embodiment thereof comprises a headed mandrel, a radially expansible, partly open clamping member received by the mandrel adjacent to its head, and a sealing cap on the mandrel having a larger diameter than the member for engaging an accesible side of a workpiece having a hole to be plugged, at least one extremity of the member being secured to the blind side of the sealing cap. Preferably, and as herein shown, the clamping member is initially stamped from sheet metal, precisely punched to control later formation and resistance to axially collapse, and then given a central dome, a partly open, tubular body portion, and opposed terminal portions extending for securement as by spot welding to the sealing cap.

In keeping with another feature of the invention and as herein shown, the sealing cap may be formed with a central collar about its mandrel-receiving aperture, and the mandrel stem be formed with a flat adapted to seat tightly in the collar of the cap upon operative retraction of the mandrel. The axial location and formation of the mandrel flat desirably is such that, when the body of the inserted clamping member has thus been collapsed, further mandrel retraction produces a "flush break," that is to say, the stem of the mandrel protruding from the installed sealing cap is broken by tension at a predetermined point usually even with the exposed surface of the cap.

BRIEF DESCRIPTION OF THE DRAWINGS

The foregoing and other features of the invention together with novel details and combinations of parts will now be more particularly described in connection with an illustrative embodiment, and with reference to the accompanying drawings thereof, in which.

DESCRIPTION OF PREFERRED EMBODIMENT

Figure 1:
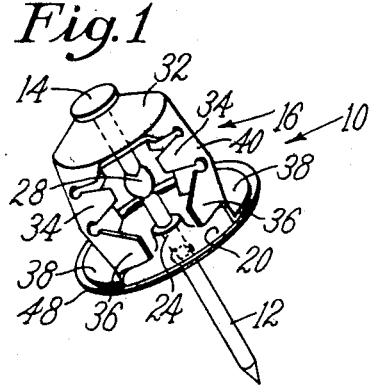
FIG. 1 is a perspective view of a hole plug fastener comprising a mandrel, partly open clamp member, and sealing cap.

A hole plug fastener generally designated 10 (FIGS. 1 and 4) preferably comprising in coaxial relation, though not necessarily so, a mandrel 12 having a head 14, a somewhat tubular clamping member generally designated 16 having an aperture 18 (FIGS. 2, 6) for receiving the mandrel, and a sealing cap 20 desirably of shallow disc shape and provided with a mandrel receiving hole 22 (FIG. 3) defined by a retention collar 24. It will be appreciated that these elements may be of different dimension or shape and of different material as deemed appropriate for adaptation to particular hole plugging conditions.

The mandrel 12 is held in the fastener with the clamping member 16 engaging the head 14 by means of a flat 26 formed on the mandrel stem to provide interference with the wall of the hole 22. Another and larger flat 28 on this stem is simultaneously formed closer to the mandrel head for a purpose later to be described. For installing the fastener 10 by relatively retracting the mandrel, a setting tool (not shown) may be of any suitable type, for instance such as are commonly employed with pull-to-set rivets. A manually operable tool for this purpose is fully disclosed in U. S. Pat. No. 3,154,210, for example, and a power operated tool for mandrel pulling is described in U. S. Pat. No. 3,088,618.

Figure 2:
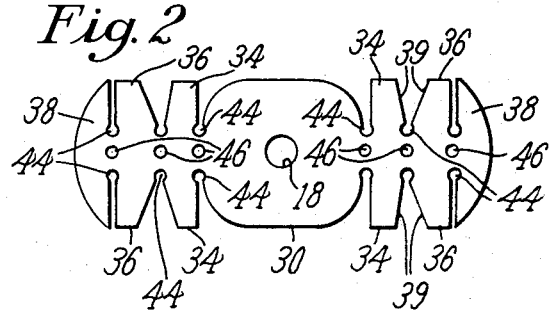
FIG. 2 is a plan view of the stamped and punched sheet metal or the like from which the clamp member is formed.

As illustrated in FIG. 2, the clamping member 16 may be initially stamped from sheet metal, usually a flat metal blank. There is thus provided a central rectangular portion 30 which is to become a dome portion 32 (FIGS. 1, 4, 5 and 7) of the fastener 10, three pairs of interconnected appendages or wings 34, 34; 36, 36 and 38, 38 of laterally diminishing width. Adjacent edges of the wings 34, 36 define oppositely disposed, symmetric V-slots 39. With the terminal or clamping wings 38, 38 held planar, a forming tool thrusts the portion 30 out of its plane to form the dome 32 and simultaneously causes opposed ends of the portion 30 along with the wings 34, 34 and 36, 36 to define a hollow, axially collapsible body 40 of the fastener 10. The body 40 is secured to the cap 20 by welding the terminal wings 38 thereto. The body 40 is substantially closed peripherally on two sides and open between circumferential ends of the wings. In order to enable the body 40 to be easily thrust into a hole 42 (FIG. 4) of a panel P to be plugged, the dome 32 of course has no diameter as large as that of the hole 42 (FIG. 4) and desirably the surface of the center portions of the wings 34 taper radially out from the mandrel axis as they extend from the mandrel head. The largest diameter across the opposed wings 34 is desirably nearly as large as that of the hole 42.

Figure 3:
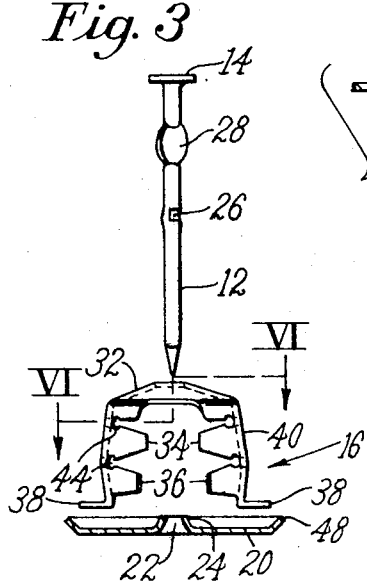
FIG. 3 is an exploded view of the fastener parts, the cap being shown in diametric section.
Figure 4:
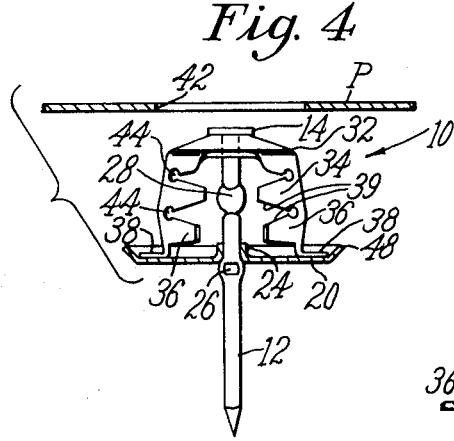
FIG. 4 is a view in elevation of the fastener about to be inserted for mounting in a panel hole to be plugged.
Figure 5:
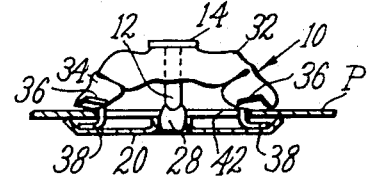
FIG. 5 is a view partly in section showing the fastener installed in its hole plugging position.
Figure 6:
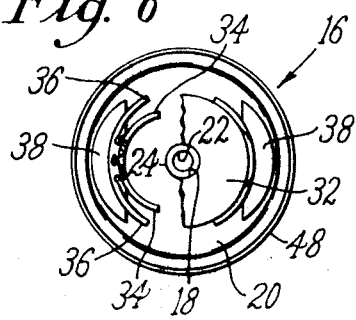
FIG. 6 is a sectional view taken on the line VI—VI of FIG. 3.
Figure 7:
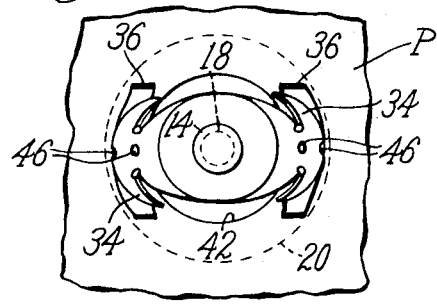
FIG. 7 is a plan view of the fastener installed as shown in FIG. 5 and illustrating how peripheral curvature of laterally expansible portions of the clamping member as indicated in FIG. 6 is modified during installation to more elongated oval shape.

The shapes of the wings 34, 34 and 36, 36 and their circumferential curvature are critical in that (a) it is essential to control lateral expansiveness of the fastener when it is collapsed by mandrel retraction to its final position shown in FIG. 5, and (b) the resistance to axial collapse of the clamping body 40 should be less than the stress required for frictionally wedging the flat 28 in the collar 24 about the hole 22 and thereafter breaking the mandrel at the flat 28. Accordingly, the size and spacing of small circular punched out localities 44 (FIGS. 1-4 and 7) at the roots between the wings, and of punched holes 46 in transverse alignment therewith to facilitate buckling along predetermined bending lines to the extent and in the manner desired is executed by gang punches with some precision. As shown in FIGS. 1, 3 and 4 the wings 36, 36 in their central portions taper inwardly toward the mandrel axis as they extend away from the mandrel head 14 in order to insure that the wings 36 will fold radially inward into clamping relation with the blind side of the panel P upon relative retraction of the mandrel stem. Also it should be observed that the contour of the planar wings 34 and 36 is such that, when generally cylindrical disposition is thereafter imparted, the tabs of the axially intermediate wings 34 extend with a smaller radius of curvature as shown in FIG. 6 than does either the radius of curvature of the tabs of the wing 36 or of the body portion adjacent to the dome 32.

While a specific configuration of clamping member 16 is disclosed and described, it will be appreciated that it is within the scope of this invention to otherwise shape the member 16 and its partly open body 40.

The cap 20, which alternately could be flat throughout, is herein shown as provided with an upturned sealing rim 48 for tightly engaging the accesible side of the plate P. The cap thus encloses the terminal wings 38, 38 as the fastener body 40 is initially thrust into the hole 42 either manually or with the aid of a setting tool gripping the expendable portion of the mandrel stem. Operation of the tool relatively to retract the mandrel head 14 then causes the inward buckling of the wings 36, 36 into clamping relation with the panel P on its blind side as shown in FIG. 5. Further retraction of the mandrel head and hence of the dome portion 32 forces axial compression and collapse of the body 40, the V-slot 39 being nearly closed as the wings 34, 34 are diametrically expanded and brought to bear on the inturned wings 36, 36 respectively. Without the difference in radius of curvature of the wings 34, 34 above referred to, it would be difficult to obtain the degree of compression, or more accurately, the controlled expansiveness of the body 40 required for tight clamping or plugging of the hole 42 by the cap 20.

As axial body collapse is about to end, the mandrel flat 28 is drawn into and tightly seats in the collar 24 about the hole 22 whereupon further mandrel retraction, if desired, causes the stem to be broken at a necked portion of the flat 28 as shown in FIG. 5.

From the foregoing it will be appreciated that the invention provides an inexpensive, permanent hole plug resistant to vibration and heat and difficult to dislodge. Advantageously, the fastener is applicable without requiring close hole tolerances and requires little skill and no new tools for effecting insertions rapidly.

Having thus described my invention, what I claim as new and desire to secure by Letters Patent of the United States is:

1. A three-piece hole plug fastener comprising a headed mandrel, a radially expansible clamping member mounted on the mandrel adjacent to its head, the clamping member being formed with at least two pairs of opposed circumferential slots, and a cap on the mandrel and having a sealing surface adapted for engaging a work surface about a hole therein to be plugged, said opposed circumferential slots defining symmetric, circumferentially tapering wings of different circumferential curvature facilitating radial expansion of the member upon relative retraction of the mandrel head toward the cap.

2. A pull-to-set hole plug fastener comprising, in coaxial relation, a sealing cap of diameter larger than a hole in a work piece to be plugged thereby, a hollow, axially collapsible, and radially enlargeable member initially insertable into the hole, and a pulling mandrel having a stem axially extending through the cap and having a head projecting beyond the member from the cap, said member being formed from generally flat, rectangular bendable sheet metal having a central portion provided with an aperture for receiving the stem of said mandrel, the central portion being flanked by opposed integral pairs of wings longitudinally spaced and shaped by laterally extending cut-out portions for circumferential forming, the pair of terminal wings being adapted to be secured to opposed portions of one side of the cap, the arrangement being such that, upon relative movement together of the cap and the mandrel head, radially opposed portions of the member are buckled into clamping relation with the work piece.

3. A blind fastener for plugging a hole in sheet metal or the like comprising, a cap larger than the hole for abutting the sheet metal substantially in hole-stopping relation, a partly tubular domed member having all initial diameters smaller than the hole for insert therethrough except for terminal portions secured to the blind side of the cap, transverse sections of the dome and body portions of the member being generally elliptic, and a headed mandrel projecting through the cap and member and relatively retractable to cause the mandrel head to engage the dome portion of said member and thereby effect radial expansion and axial collapse of certain of said body portions into clamping relation with the sheet metal and said cap, the mandrel having its stem engageable frictionally with the wall of an aperture in the cap to retain the head of the mandrel in external engagement with the domed portion of said member, the mandrel stem being formed with an axial flat for plugging the cap aperture during mandrel retraction, and said mandrel stem being formed adjacent to its flat with a frangible portion sufficiently strong to transmit tension for effecting said collapse of the body portions and thereafter break upon urging said body portions into clamping relation with the sheet metal.

* * * * *